US005152870A

United States Patent [19]

Levinson

[11] Patent Number: 5,152,870

[45] Date of Patent: Oct. 6, 1992

[54] METHOD FOR PRODUCING LAMP FILAMENTS OF INCREASED RADIATIVE EFFICIENCY

[75] Inventor: Lionel M. Levinson, Schenectady, N.Y.

[73] Assignee: General Electric Company, Schenectady, N.Y.

[21] Appl. No.: 644,137

[22] Filed: Jan. 22, 1991

[51] Int. Cl.[5] ........................ B44C 1/22; C03C 15/00; C23F 1/02; B05D 5/12

[52] U.S. Cl. ................................ 156/659.1; 156/643; 156/654; 156/661.1; 156/904; 219/121.69; 427/111; 445/48

[58] Field of Search ............ 156/643, 654, 656, 659.1, 156/661.1, 664, 904, 345; 445/48, 53.1; 427/111, 309; 219/121.68, 121.69

[56] References Cited

PUBLICATIONS

Craighead, H. G., Howard, R. E. and Tennant, D. M., "Selectively Emissive Refractory Metal Surface", Applied Physics Letters, Jan. 1981, vol. 38, No. 2, pp. 74–76.

Waymouth, J. F., "Where Will the Next Generation of Lamps Come From?", Fifth International Symposium on the Science and Technology of all Light Sources, York, England, Sep. 10–14, 1989, pp. 21–26 and FIG. 20.

*Primary Examiner*—William A. Powell
*Attorney, Agent, or Firm*—Marvin Snyder

[57] ABSTRACT

A method for fabricating incandescent lamp filaments having surface features of submicron-to-micron sized cross sections which increase the radiative efficiency of the filament comprises depositing at least one enveloping mask layer on the filament and cutting a selected pattern into the filament by ablation with a beam of radiated energy. The desired surface features are formed on the filament by a process that includes stenciling through the selected pattern.

20 Claims, 4 Drawing Sheets 16
14
T
13
2
9

18
20
20
16
14
9
2

20
16
22
14
9
2

22
22
14
13
9
2

5
14
9
2

5
6
h
13
9
2

METHOD FOR PRODUCING LAMP FILAMENTS OF INCREASED RADIATIVE EFFICIENCY

The present invention relates generally to electric incandescent lamps, and more particularly to a method for producing lamp filaments of enhanced radiative efficiency.

BACKGROUND OF THE INVENTION

Incandescent lamp filaments emit visible and non-visible radiation when an electric current of sufficient magnitude is passed through the filament. A substantial amount of the energy radiated by an incandescent lamp filament, however, is in the form of non-visible radiation. As a consequence, the radiative efficiency of a typical tungsten filament, measured by the ratio of power emitted at visible wavelengths to the total radiated power over all wavelengths, is relatively low, of the order of 6.0% or less.

It has been observed that the radiative efficiency of such common filament materials as tungsten can be increased by texturing the filament surface with submicron sized features. An article entitled "Selectively Emissive Refractory Metal Surfaces," 38 *Applied Physics Letters* 74 (1981), by H. G. Craighead, R. E. Howard, and D. M. Tennant states that such improved radiative efficiency results from an increase in the emissivity of visible light from the tungsten. In the present context, emissivity is defined as the ratio of the radiant flux, at a given wavelength, from the surface of a substance (such as tungsten) to the radiant flux emitted under the same conditions by a black body. The hypothetical black body is assumed to absorb all and reflect no radiation incident upon it. The Craighead article, which is incorporated herein by reference, states that the emissivity of visible light from a textured tungsten surface was found to be twice that of a non-textured surface and suggests that the increase is the result of a more effective coupling of the electromagnetic radiation from the tungsten to free space. The textured surface of the tungsten sample described in the Craighead article had depressions in the surface separated by columnar structures having a cross-section of approximately 0.15 micrometers (microns) and a height above the filament surface of approximately 0.3 microns. These features were randomly arranged and were formed on the surface of the tungsten sample using a non-selective reactive ion etching technique.

A similar suggestion for enhancing incandescent lamp efficiency by modifying the surface of a tungsten lamp filament appears in a paper entitled "Where Will the Next Generation of Lamps Come From?", by John F. Waymouth and dated September 1989, and which is incorporated herein by reference. See pages 22–25 and FIG. 20. In this paper Waymouth hypothesizes that filament surface perforations measuring 0.35 microns across, 7 microns deep, and with walls 0.15 microns thick, would serve as waveguides which would effectively couple radiation in the visible wavelengths between the tungsten and free space, but inhibit the emission of non-visible radiation from the filament. As compared to a conventional filament, the radiative efficiency of such a filament would be increased and less electrical energy would be required to produce the same lamp brightness. Waymouth observes that the perforations on the filament would need to be produced by semiconductor lithographic techniques, but that the dimensions described above are beyond current state-of-the-art capabilities in this area of technology.

To achieve a high radiative efficiency, such as described by Craighead et al. or Waymouth, requires that submicron-sized surface features be formed on the lamp filament. Filaments are typically cylindrical or ribbon-shaped tungsten wires, portions of which may be coiled. The aforesaid surface features preferably cover substantially the entire filament surface intended to emit visible light. Such a requirement presents a problem, particularly where curved filament wires are concerned, because conventional semiconductor lithographic techniques for producing submicron-sized surface features are designed for use with a flat substrate, flatness being critical to creating high definition patterns. Also, unlike semiconductor fabrication, the method used to produce submicron-sized surface features on a lamp filament need not have perfect or near perfect feature yields. An adequate increase in lamp performance can be achieved with feature yields of approximately 90%. Another area of concern is that, at the normal operating temperatures of tungsten filaments, between 2000° C. and 2500° C., atom migration of the filament material along the surface can result in deformation or obliteration of submicron-sized surface features. Thus, it is beneficial if the surface features are fabricated in a manner that makes them resistant to such atom migration.

OBJECTS OF THE INVENTION

It is a principal object of the present invention to provide a method for fabricating an incandescent lamp filament which avoids the foregoing disadvantages.

It is another object of the present invention to provide a method of fabricating an incandescent lamp filament having increased radiative efficiency.

A further object of this invention is to provide a method of fabricating a high efficiency filament having submicron-sized surface features that is simple, reliable, and cost effective.

A still further object of this invention is to provide a method of fabricating submicron-sized surface features on a lamp filament which substantially maintain their form over the filament life.

These and other objects of the invention, together with further features and advantages thereof will become apparent from the following detailed specification when read in conjunction with the accompanying drawings.

SUMMARY OF THE INVENTION

The present invention is directed to a method for fabricating incandescent lamp filaments having surface features of submicron-to-micron sized cross section which increase the radiative efficiency of the filaments. In one embodiment, the lamp filament is coated with a first mask layer which in turn is overlaid with a second mask layer. The second mask layer is ablated with a laser beam to cut a selected pattern through the thickness thereof. The first mask layer is subsequently etched by stenciling through the patterned second mask layer and the remaining portions of the second mask layer are then removed. Filament-compatible material is selectively deposited on the filament surface through the patterned first mask layer by the use of vapor deposition or the like. The deposited material forms boundary walls on the filament surface with cavities therebetween. The pattern of these surface features corresponds to the selected pattern ablated into the second mask layer. The remaining portions of the first mask layer are then removed to completely expose the filament surface. In an alternative embodiment, the selected pattern is ablated into a single mask layer that envelops the filament and the filament surface is then etched through this pattern to form a pattern that includes cavities of the desired submicron-to-micron size and which corresponds to the selected pattern.

DETAILED DESCRIPTION OF THE INVENTION

Figure 1:
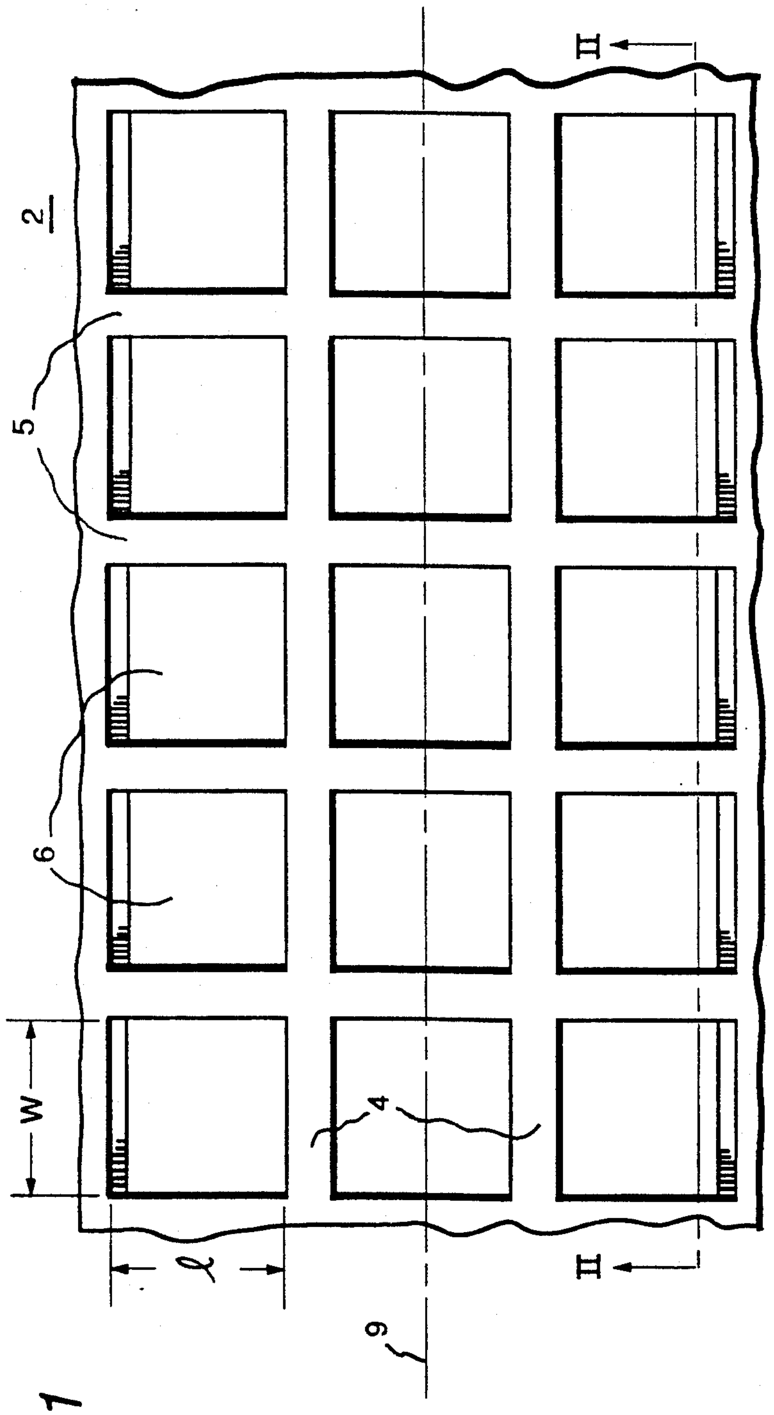
FIG. 1 is a plan view of a portion of a filament illustrating surface features formed in accordance with the present invention.

FIG. 1 shows a portion of a filament 2 with surface features formed in accordance with the present invention. Filament 2 extends along a longitudinal axis 9. As shown, the filament surface features comprise a plurality of horizontal boundary walls 4 and vertical boundary walls 5 which intersect to form between them a plurality of cavities 6. Each cavity 6 has a length (1) and a width (w) which constitute the cross-sectional dimensions of the cavity. The method of forming these surface features does not necessarily provide all cavities with identical shapes and cross-sectional dimensions. The cross-sectional length and width dimensions are chosen to produce the desired increase in the radiative efficiency of the lamp filament and will fall within a range of between about 0.2 and 2 microns. As illustrated in FIG. 1, these cavities have substantially parallelogram-shaped cross-sectional areas; circular or other cross-sectional shapes, however, can also produce improved filament performance. For circular-shaped cross-sectional areas, the selected diameter will fall within a range of about 0.2 to 2 microns. Similarly, for any cross-sectional shape, the cross-sectional area of the cavity having the selected cross-sectional dimensions will fall within a range of about 0.03 microns squared to about 4 microns squared.

Figure 2:
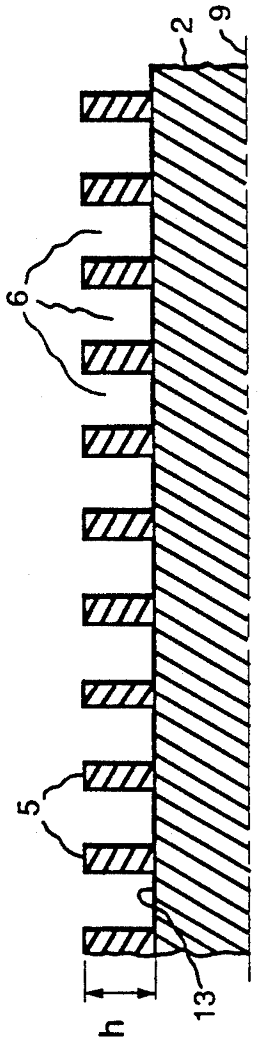
FIG. 2 is a cross-sectional side elevational view taken along the line II—II of FIG. 1.

In FIG. 2, only a portion of filament 2 of an incandescent lamp is shown for the sake of simplicity . The filament may have any desired cross-sectional shape, but is assumed here to be cylindrical, i.e. of circular cross-section, with a diameter on the order of a millimeter or less. Thus, it will be understood that filament surface 13 curves about its longitudinal axis 9. Although shown as a line in the drawing, filament surface 13 may also curve along the length of the filament wire when the filament, or a portion thereof, is coiled. Filament 2 is typically made of tungsten, but may also comprise other filament materials. To improve filament efficiency, it is desirable that submicron-sized surface features be formed on all areas of the filament surface that are intended to emit radiation.

Figures 3A, 3B, 3C, 3D, 3E, 3F:
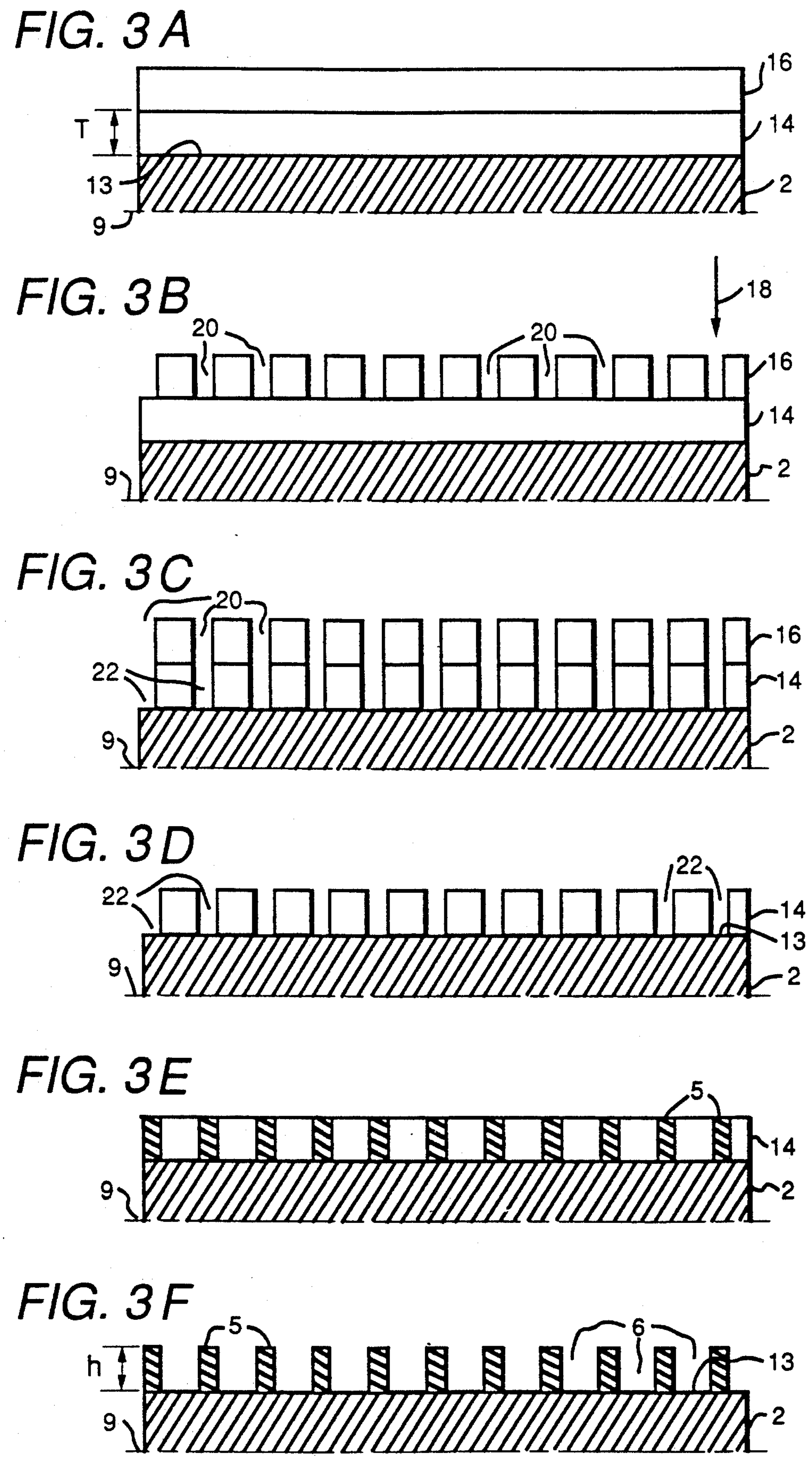
FIGS. 3(A) through 3(F) are cross-sectional side elevation views illustrating successive steps in the formation of the surface features of the filament as shown in FIG. 2 in accordance with a preferred embodiment of the present invention.

As illustrated in FIG. 3(A), a first mask layer 14 is deposited on filament surface 13, e.g. by spraying, dipping, chemical vapor deposition (CVD), or the like, so as to envelop filament 2. The mask material may be $SiO_2$ or any other material that can withstand the heat, pressure, and associated conditions to which mask layer 14 is subsequently subjected. The thickness T of mask layer 14 is preferably between about 0.1 and 20 microns.

A second enveloping mask layer 16 is deposited over first mask layer 14, also by spraying, dipping, CVD or the like. Mask layer 16 is comprised of a material such as a polymer, e.g. polyimide, polymethylmethacrylate (PMMA), or the like, which can be readily ablated by a beam of radiated energy, as described below. The thickness of mask layer 16 is typically between 0.1 and 2 microns.

As illustrated in FIG. 3(B), a beam of radiated energy 18 is used to ablate a selected pattern into mask layer 16. Beam 18 cuts through the full thickness of the mask layer 16 to the immediately subjacent structure, i.e. to first mask layer 14. The ablation process creates a plurality of channels 20 in mask layer 16 in accordance with the pattern selected. In a preferred embodiment, the channels intersect in an orthogonal matrix which constitutes the selected pattern. The invention, however, is not so limited and other patterns may be ablated into mask layer 16. The length and width of the areas formed between the orthogonally intersecting channels 20 is chosen to range between about 0.2 and about 2 microns.

The beam of radiated energy 18 preferably originates from a laser source, e.g., an excimer laser or the like, and its resolution is sufficiently high to produce the submicron-sized dimensions of the selected pattern. Ablation results in clean, well defined cuts in the mask layer, deriving from thermal and non-thermal interactions of the radiation beam with the mask layer. The intensity and position of the beam may be controlled at the source, or through lenses, to assist in obtaining cuts of the desired depth or shape to cut the selected pattern into mask layer 16.

Figure 5:
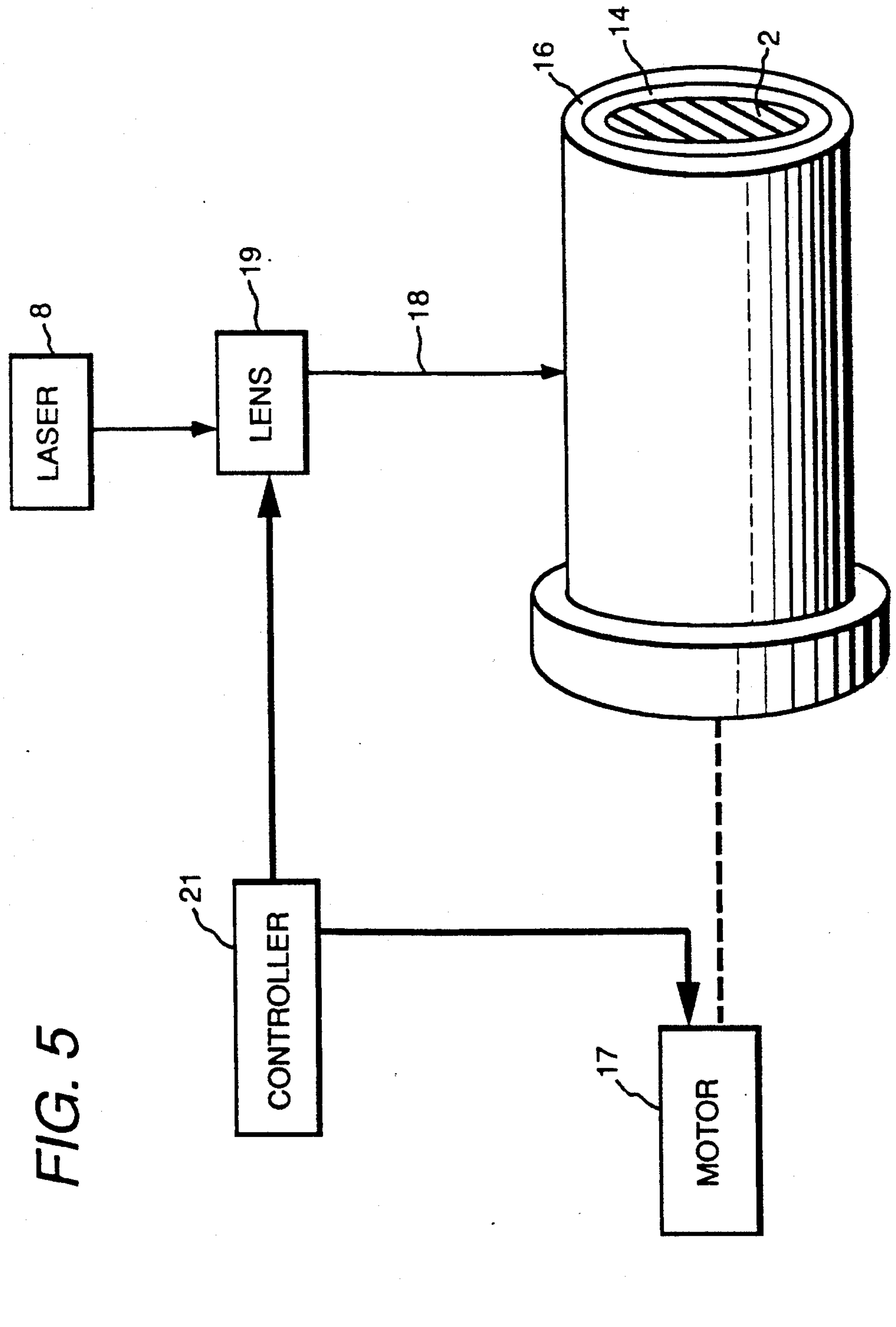
FIG. 5 is a block diagram of an exemplary arrangement of apparatus for carrying out certain steps in the method that constitutes the subject matter of the present invention.

In addition to beam positioning to ablate the selected pattern into mask layer 16, relative movement between beam 18 and filament 2 is required for the beam to reach all areas of mask layer 16. This movement can be achieved in a number of ways, e.g. by moving beam 18 relative to filament 12, or by moving the filament relative to the beam. As appears in FIG. 5, for example, the cylindrical filament 2 can be rotated by means of a motor 17 mechanically coupled to the filament, thus exposing different areas of mask layer 16 to ablating beam 18 from laser source 8. In addition to such filament motion, the beam may also be moved along the axis of the filament 2, e.g. by means of a lens 19 (which may be movable), to expose mask layer 16 along the length of the filament. In the illustrated example, a controller 21 coordinates the rotation of motor 17 with the positioning of lens 19 to provide for the ablation of the selected pattern into the mask layer. Alternative arrangements are also possible, such as where the beam source rotates around the masked filament in order to direct beam 18 at the filament from different directions.

Referring to FIG. 3(C), after the selected pattern has been ablated into second mask layer 16, etching of first mask layer 14 is carried out by stenciling through the selected pattern formed by channels 20 in mask layer 16. The etching step removes portions of mask layer 14 to form a plurality of extensions 22 of channels 20, which reach down to filament surface 13. These channel extensions 22 form a pattern in mask layer 14 which corresponds to the selected pattern ablated into mask layer 16.

As illustrated in FIG. 3(D), after mask layer 14 has been etched, the remaining portions of mask layer 16 are removed, e.g. by etching or by a similar process, to expose the theretofore covered portions of mask layer 14.

Referring to FIG. 3(E), in accordance with the present invention filament-compatible refractory material is selectively deposited on filament surface 13 by stenciling through channel extensions 22, using known selective chemical vapor deposition or similar techniques. The selective deposition of the refractory material forms a plurality of intersecting horizontal and vertical boundary walls 4 and 5, respectively, on filament surface 13, vertical walls 5 being shown in cross-section in FIG. 3(E). Subsequently, as illustrated in FIG. 3(F), the remaining portions of mask layer 14 are removed, e.g. by etching or the like, thereby exposing the covered portions of filament surface 13.

The surface features thus formed on filament surface 13 have a pattern that corresponds closely to the selected pattern ablated into mask layer 16. Such correspondence includes the cross-sectional dimensions of cavities 6 (FIG. 1) formed between intersecting boundary walls, which range in size between about 0.2 and 2 microns. The height h of boundary walls 4 and 5, as indicated in FIG. 3(F) for wall 5, is a function of the amount of filament-compatible material deposited. Height (h), and hence the depth of the cavities formed between the boundary walls, is selected to be in the range of about 2 to 10 times the magnitude of the cross-sectional dimensions. For example, where the average cross-sectional dimensions 1 and w of cavities 6 (FIG. 1) are 0.5 micron, the height h of the boundary walls will be between about 1.0 and 5.0 microns.

The filament-compatible refractory material is chosen to readily adhere to filament surface 13 when deposited and to have emissivity characteristics compatible with the material of the filament itself so as to radiate visible light under the normal operating conditions of filament 2. Thus, the material may be chosen from the group of metals that includes tungsten, tungsten iridium, tungsten carbide, tungsten rhenium, tantalum carbide, hafnium carbide, or the like. The alloys or compounds of filament-compatible materials noted above provide both good emissivity characteristics and increased resistance to atom migration at the filament operating temperatures. This resistance to atom movement provides increased structural stability for boundary walls 4 and 5, thereby lessening the likelihood that under normal operating temperatures the boundary walls will be deformed or destroyed due to atom migration.

Figure 4A:
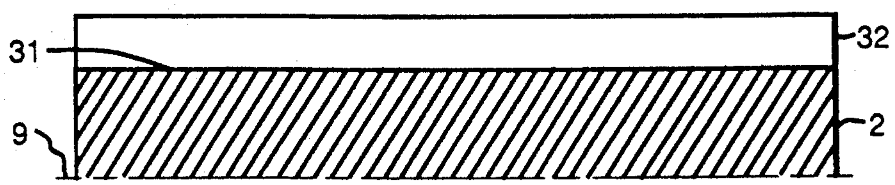
FIGS. 4(A) through 4(D) are cross-sectional side elevation views of a filament similar to that of FIG. 1 and illustrating successive steps in the formation of the surface features in accordance with another embodiment of the present invention.

In an alternative embodiment of the present invention, as illustrated in FIG. 4(A), an enveloping mask layer 32 is deposited on a filament 2. Mask layer 32 comprises a polymer material such as PMMA, polyimide or the like, having a thickness typically between about 0.1 and 2 microns.

Figure 4B:
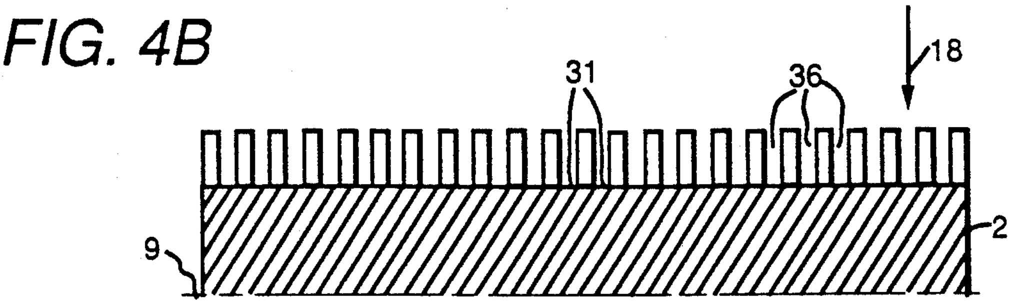

Referring to FIG. 4(B), portions of mask layer 32 are ablated by a beam of radiated energy 18 to form a selected pattern therein in a manner similar to the ablation process described in connection with FIG. 3.

In this embodiment, however, beam position and intensity are controlled such that the ablation step removes portions of mask layer 32 to form a plurality of holes 36, preferably having the cross-section of a parallelogram. The cross-sectional dimensions of holes 36 are substantially the same as length (1) and width (w) of cavities 6 in FIG. 1 and their depth is such that they extend down to surface 31 of filament 30.

Figure 4C:
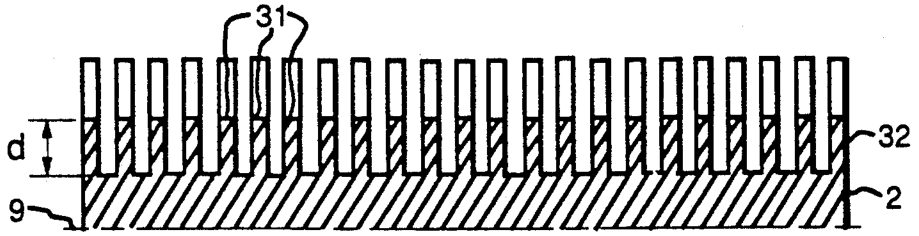

Following the ablation step, filament 2 is etched, as illustrated in FIG. 4(C), using conventional etching techniques. The etching step is carried out by stenciling the etchant through holes 36 in mask layer 32 to form cavities 6 in the immediately subjacent structure, i.e. in filament 2. Cavities 6 form a pattern that corresponds closely to the selected pattern in mask layer 32, having cross-sectional length and width dimensions which range between about 0.2 and about 2 microns. The etchant is applied for a sufficient time period to provide a cavity depth d, in the range of between about 2 to 10 times the magnitude of the cross-sectional dimensions of cavities 6.

Figure 4D:
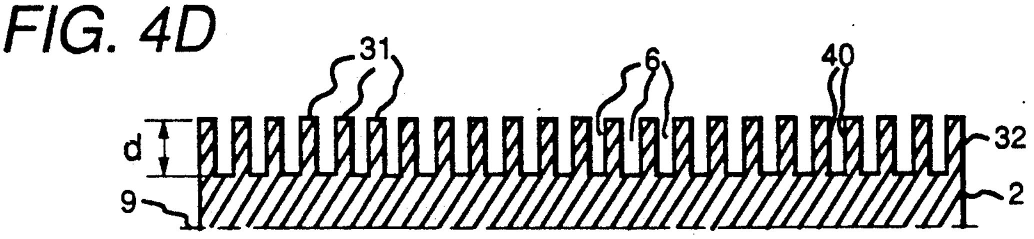

Referring to FIG. 4(D), following the etching of filament 2, the remaining portions of the mask layer 32 are removed, e.g. by etching or by other conventional processes, to expose the theretofore uncovered portions of filament surface 31.

It will be readily understood by those skilled in the art that the present invention is not limited to specific embodiments described and illustrated herein. Many variations, modifications and equivalents of the invention disclosed herein will now be apparent to those skilled in the art, or will be reasonably suggested by the foregoing specification and drawings, without departing from the substance or scope of the invention. Accordingly, it is intended that the invention be limited only the spirit and scope of the appended claims.

What is claimed is:

1. A method for increasing the radiative efficiency of an incandescent lamp filament, comprising the steps of:

depositing at least one enveloping mask layer on said filament;

ablating said at least one mask layer with a beam of radiated energy to cut a selected pattern through the full thickness of said layer;

forming surface features on said filament arranged in a pattern that corresponds substantially to said selected pattern and including cavities of submicron-to-micron size, said last recited step including stenciling through said selected pattern to the structure immediately subjacent to said at least one mask layer; and removing mask material remaining after the formation of said surface features to fully uncover the surface of said filament.

2. The method of claim 1 wherein said stenciling step includes etching through said selected pattern onto said subjacent structure.

3. The method of claim 1 wherein said beam is a laser beam.

4. The method of claim 1 and further including the step of controlling the position and intensity of said beam during said ablating step in accordance with the selected pattern chosen.

5. The method of claim 3 and further including the step of controlling the position and intensity of said beam during said ablating step in accordance with the selected pattern chosen.

6. The method of claim 4 and further comprising the step of providing relative movement between said filament and said beam to expose different areas of the mask-enveloped filament to said beam.

7. The method of claim 6, wherein said beam is directed at said filament from different positions.

8. The method of claim 1, wherein each of said cavities has a cross-sectional area substantially in the form of a parallelogram.

9. The method of claim 1 wherein said cavities have cross-sectional dimensions in a range between about 0.2 and 2 microns.

10. The method of claim 9 wherein said cavities have depth dimensions in a range between about 2 and 10 times the dimensions of said first-recited range.

11. A method for increasing the radiative efficiency of light from an incandescent lamp filament comprising the steps of:

depositing a first enveloping mask layer on the surface of said filament;

depositing a second enveloping mask layer on said first mask layer;

ablating said second mask layer with a beam of radiated energy to cut a selected pattern through the thickness of said second mask layer;

etching said first mask layer through said selected pattern in said second mask layer, said etching step being effective to cut a pattern through the thickness of said first mask layer corresponding substantially to said selected pattern;

removing the remaining portions of said second mask layer to expose said first mask layer;

selectively depositing a filament-compatible refractory material through the pattern in said first mask layer onto said filament surface, said refractory material forming boundary walls on said filament surface in a pattern corresponding substantially to said selected pattern, said walls defining cavities of predetermined size therebetween; and removing the remaining portions of said first mask layer to fully uncover said filament surface.

12. The method of claim 11, wherein the material of said first mask layer comprises an oxide and the material of said second mask layer comprises a polymer.

13. The method of claim 11 and further including the steps of controlling the position and intensity of said beam during said ablating step to form said selected pattern.

14. The method of claim 11, wherein said filament-compatible material comprises one of the group consisting of tungsten, tungsten iridium, tungsten carbide, tungsten rhenium, tantalum carbide, and hafnium carbide.

15. The method of claim 11, wherein said cavities have cross-sectional dimensions between about 0.2 and 2 microns and a depth between about 2 and 10 times the magnitude of said cross-sectional dimensions.

16. The method of claim 15, wherein each of said cavities has a cross-sectional area substantially in the form of a parallelogram.

17. A method for increasing the radiative efficiency of an incandescent lamp filament, comprising the steps of:

depositing an enveloping mask layer on the surface of said filament;

ablating said mask layer with a beam of radiated energy to cut a selected pattern through the thickness of said mask layer;

etching said filament surface through said selected pattern in said mask layer to form cavities in said filament surface, said cavities having predetermined dimensions in the submicron-to-micron range and being arranged in a pattern corresponding substantially to said selected pattern; and removing all remaining mask material after ablation of said enveloping mask layer to fully uncover said filament surface.

18. The method of claim 17 wherein said mask material comprises a polymer.

19. The method of claim 17 wherein said cavities have cross-sectional dimensions between about 0.2 to 2 microns and a depth between about 2 and 10 times the magnitude of said cross-sectional dimensions.

20. The method of claim 19 wherein each of said cavities has a cross-sectional area substantially in the form of a parallelogram.

* * * * *